United States Patent
Schultz

(10) Patent No.: US 9,148,279 B2
(45) Date of Patent: Sep. 29, 2015

(54) PHASE LOCKING FOR MULTIPLE SERIAL INTERFACES

(75) Inventor: Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 199 days.

(21) Appl. No.: 13/138,001

(22) PCT Filed: Dec. 22, 2008

(86) PCT No.: PCT/US2008/013950
§ 371 (c)(1),
(2), (4) Date: Jun. 22, 2011

(87) PCT Pub. No.: WO2010/074666
PCT Pub. Date: Jul. 1, 2010

(65) Prior Publication Data
US 2011/0316596 A1   Dec. 29, 2011

(51) Int. Cl.
*H03D 3/24* (2006.01)
*H04L 7/033* (2006.01)

(52) U.S. Cl.
CPC .................................. *H04L 7/0337* (2013.01)

(58) Field of Classification Search
USPC .......................................................... 375/373
See application file for complete search history.

(56) References Cited

U.S. PATENT DOCUMENTS

| 4,031,317 | A | 6/1977 | McClain et al. | |
|---|---|---|---|---|
| 6,470,458 | B1 | 10/2002 | Dreps et al. | |
| 8,149,468 | B2 * | 4/2012 | Okamoto | 358/409 |
| 2003/0189503 | A1 | 10/2003 | Kim et al. | |
| 2004/0193975 | A1 | 9/2004 | Tarango et al. | |
| 2005/0207280 | A1 | 9/2005 | Fowler et al. | |
| 2006/0121933 | A1 * | 6/2006 | Ikeda | 455/550.1 |

(Continued)

FOREIGN PATENT DOCUMENTS

| JP | 2005-328138 | 11/1924 |
|---|---|---|
| JP | 61-72443 | 4/1986 |

(Continued)

OTHER PUBLICATIONS

Search Rept: Aug. 10, 2009.

*Primary Examiner* — Lihong Yu
(74) *Attorney, Agent, or Firm* — Robert D. Shedd; Vincent E. Duffy; Palak Bhakta

(57) ABSTRACT

An arrangement is described which reduces the number of phase locked loops (PLLs) required in a typical high speed serial interface system. A reference clock is sent from a transmitter on a main board to a receiver on a system board, which employs a PLL that also drives a transmitter on the system board. The transmitter on the system board transmits a data signal to a receiver on the main board which does not require a PLL. Rather, the receiver on the main board is clocked with a static-phase, master reference clock, and the phase of the reference clock sent from the main board is controlled so as to achieve synchronism of the data signal received by the main board receiver using the static-phase, master reference clock. In this way, each high speed serial interface loop between the main board and the individual system boards is controllably adjusted in phase, compensating for interconnection path lengths and providing synchronism between the received signal and the common, static-phase, master reference clock which supplies all the main controller board receivers.

23 Claims, 5 Drawing Sheets

(56) References Cited

U.S. PATENT DOCUMENTS

2006/0165186 A1* 7/2006 Segaram .................. 375/257
2007/0121711 A1   5/2007 Offord et al.

FOREIGN PATENT DOCUMENTS

WO    WO 2005/004378    1/2005
WO    WO 2008/026164    3/2008

* cited by examiner

PHASE LOCKING FOR MULTIPLE SERIAL INTERFACES

This application claims the benefit, under 35U.S.C. §365 of International Application PCT/US 2008/013950, filed Dec. 22, 2008, which was published in accordance with PCT Article 21(2) on Jul. 1, 2010 in English.

FIELD OF THE INVENTION

The present invention relates to high speed serial digital interfaces and in particular to phase locking methods and apparatus with a reduced requirement for multiple phase locked loops.

BACKGROUND INFORMATION

High speed serial interfaces, such as low-voltage differential signaling (LVDS) are increasingly being used to reduce interconnection between integrated circuits (ICs) and to lower electromagnetic (EM) and electrostatic (ES) radiation from circuit boards. These serial interfaces have sync generation and self-locking capability using only a clock reference, a phase locked loop (PLL), and a data bus for each receiver.

LVDS is a high-speed digital interface that is popular in applications that demand high data rate transmission with low power consumption and high noise immunity. Low-voltage differential signaling has been standardized under ANSI/TIA/EIA-644, EIA/TIA-644. LVDS is a differential balanced interface which can communicate data at speeds of better than 400 Mbps over a distance of 10 meters. Communication speeds and distances, however, are dependent on the type of cable, back plane, or circuit board carrying the LVDS signal.

A typical LVDS arrangement is shown in FIG. 1 in which a main board communicates with multiple system boards A-D via LVDS interfaces. Each LVDS interface employs a transmitter and receiver at each terminal end. FIG. 1 shows that each receiver (RX) is associated with a phase locked loop (PLL) which regenerates a clock signal from the received data, often utilizing both edge polarities. In addition, FIG. 1 shows the path lengths connecting each terminal end of the system to be different, as depicted by symbols LA, LB, LC, and LD. Differences in phase due to these differing path lengths are accommodated by the individual PLLs associated with each receiver (RX). Consequently, the typical high speed serial interface arrangement shown in FIG. 1 requires four phase locked loops on the main board and one on each system board.

A typical low cost field programmable gate array (FPGA) cannot support the system architecture depicted in FIG. 1 due to the limited number of, for example, four phase locked loops that can be implemented on such an FPGA. This may limit the number of system boards that may be interfaced in an exemplary system or may necessitate running serial buses and PLLs at twice or three times the otherwise required frequency in order to achieve the required system bandwidth. This is a serious limitation when four or more serial buses are to be handled by a single IC. Typically, additional phase locked loops are utilized within the exemplary main controller board of FIG. 1 to provide a common clock to each transmitter and for other clocking and drive signals needed for other devices such as double data rate (DDR) memory.

SUMMARY OF THE INVENTION

In an exemplary embodiment, the present invention provides an arrangement which reduces the number of phase locked loops required in a typical high speed serial interface system. In an exemplary embodiment of an arrangement in accordance with the present invention, a reference clock is sent from a transmitter on a main board to a receiver on a system board, which ostensibly employs a PLL which also drives a transmitter on the system board. The transmitter on the system board transmits a data signal to a receiver on the main board, which in accordance with the present invention, does not require a PLL. Rather, the receiver on the main board is clocked with a static-phase, master reference clock, and the phase of the reference clock sent from the main board is controlled so as to achieve synchronism of the data signal received by the receiver on the main board with the static-phase, master reference clock. In this way, each high speed serial interface loop between the main board and the individual system boards is controllably adjusted in phase, compensating for interconnection path lengths and providing synchronism between the received signal and the common, static-phase, master reference clock which supplies all the main controller board receivers. This arrangement reduces the number of PLLs needed on the main board by N-1, where N is the number of interfaces.

In a further exemplary embodiment, each transmitter on the main board is driven by a common, static phase, master reference clock, while each receiver on the main board is driven by a clock whose phase is controlled so as to achieve synchronism with the data signal received by that receiver.

The aforementioned and other features and aspects of the present invention are described in greater detail below.

DETAILED DESCRIPTION

Figure 1:
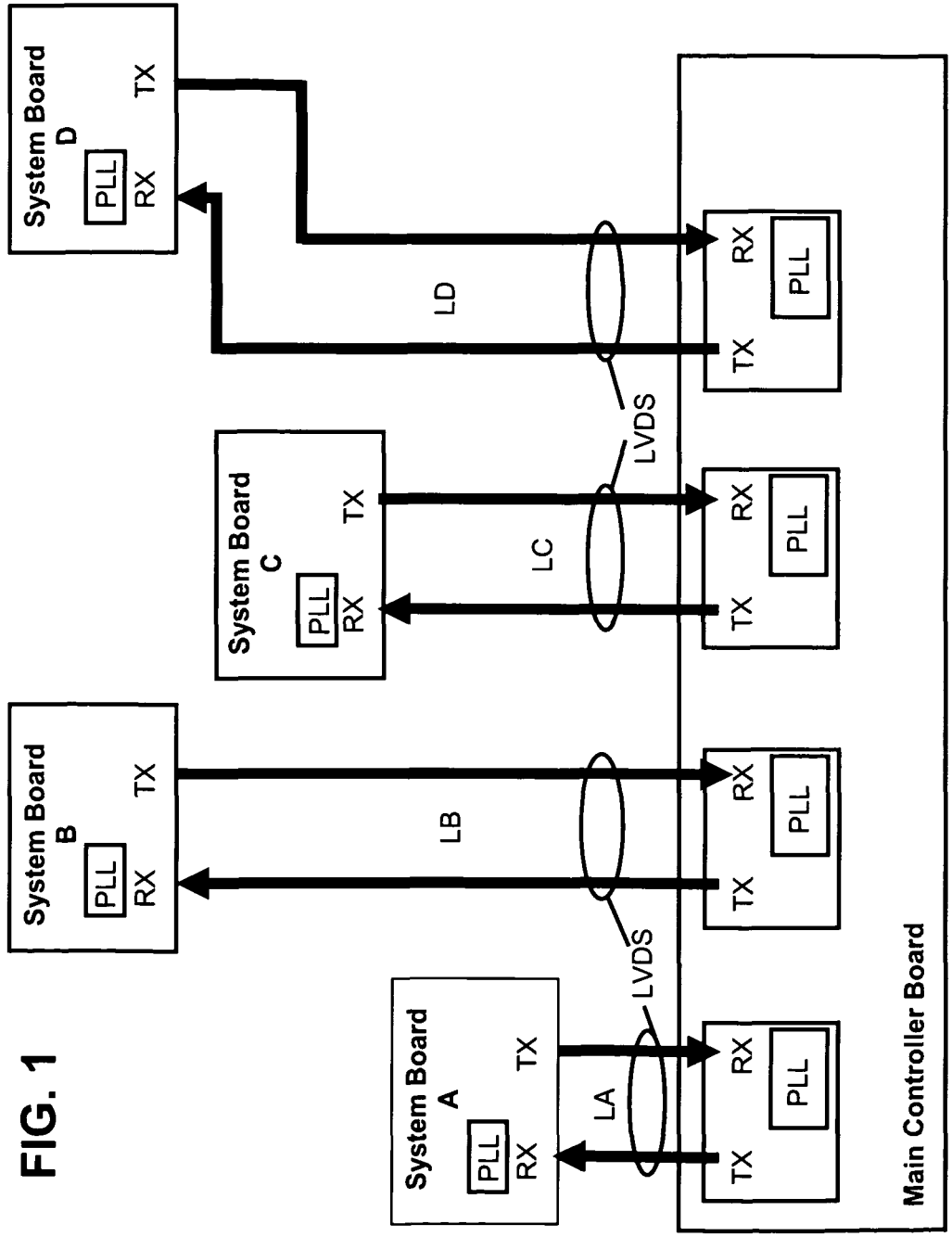
FIG. 1 is a block diagram of a typical arrangement with a low-voltage differential signaling (LVDS) interface between a main controller board and each of four system boards.
Figure 2:
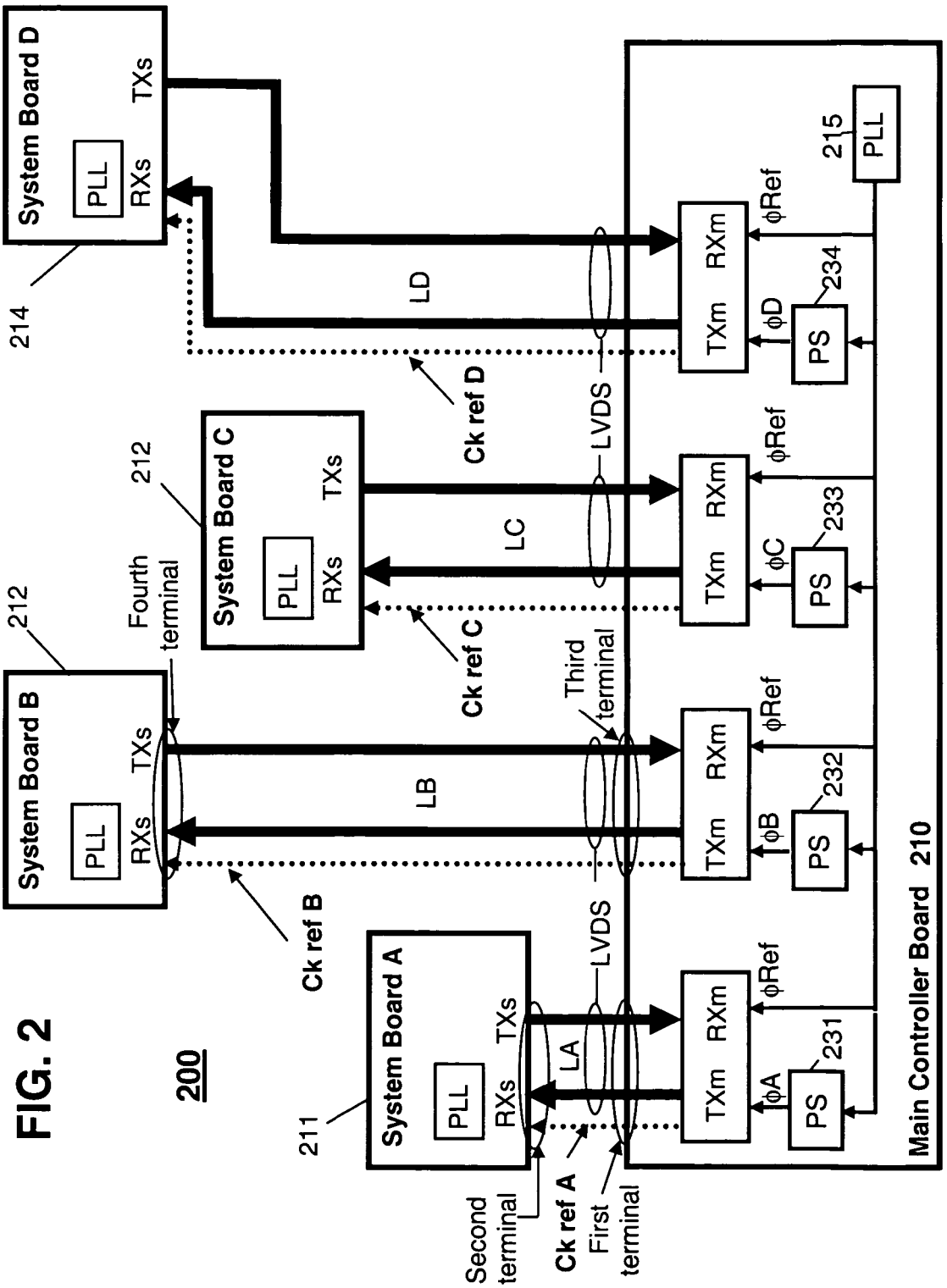
FIG. 2 is a block diagram of an exemplary embodiment of a system in accordance with the present invention.

FIG. 2 is a block diagram of an exemplary arrangement 200 in accordance with the present invention in which a main board 210 communicates via an LVDS interface with each of four system boards 211-214 using one PLL 215 on the main board and one PLL on each of the system boards. This is achieved by sending a reference clock CKrefA-CKrefD from the main board 210 to each of the system boards 211-214. Typically, each transmitter (TXm) on the main board 210 will send data in synchronism with the respective reference clock, but for purposes of the present invention, having a data path from each main board transmitter (TXm) to each system board is optional.

On each system board 211-214, the respective reference clock CKrefA-CKrefB received from the main board 210 is provided to a PLL which, in turn, generates a clock signal for clocking a receiver (RXs) and a transmitter (TXs). The receiver (RXs) on each system board 211-214 receives data from a transmitter (TXm) on the main board 210 and the transmitter (TXs) on each system board 211-214 transmits data to a corresponding receiver (RXm) on the main board. Data transmitted from each system board 211-214 is in synchronism with the respective reference clock CKrefA-CKrefB from the main board 210.

In the exemplary embodiment of FIG. 2, the PLL 215 generates a common, static-phase reference clock signal with phase φ Ref which clocks the receivers (RXm) on the main board 210. This clock (or a related static-phase reference clock) is also provided to phase selector (PS) blocks 231-234 which generate respective phase-adjustable reference clock signals with phases φA-φD corresponding to the reference clocks CKrefA-CKrefD. As described in greater detail below, the phase selector blocks 231-234 operate so as individually adjust the phase of each of the reference clocks CKrefA-CKrefD so that the data sent from the transmitter (TXs) of each of the system boards 211-214 is in synchronism with the static phase reference clock (of phase φ Ref) clocking the receivers (RXm) on the main board 210.

Typically, the cable or connection lengths LA-LD between the main board 210 and the system boards 211-214 will be different for each physical system board location. Because the serial data signal from each main board transmitter (TXm) to each system board receiver (RXs) and the respective reference clock signal (CKrefA-CKrefD) travel over the same cable length, there is no significant time delay or skew between them. The paths from each system board transmitter (TXs) to the main board receivers (RXm), however, do not use clock references. Clock reference signals may be provided, but they would not be used on the main board as there are no PLLs dedicated to each main board receiver (RXm).

Figure 3:
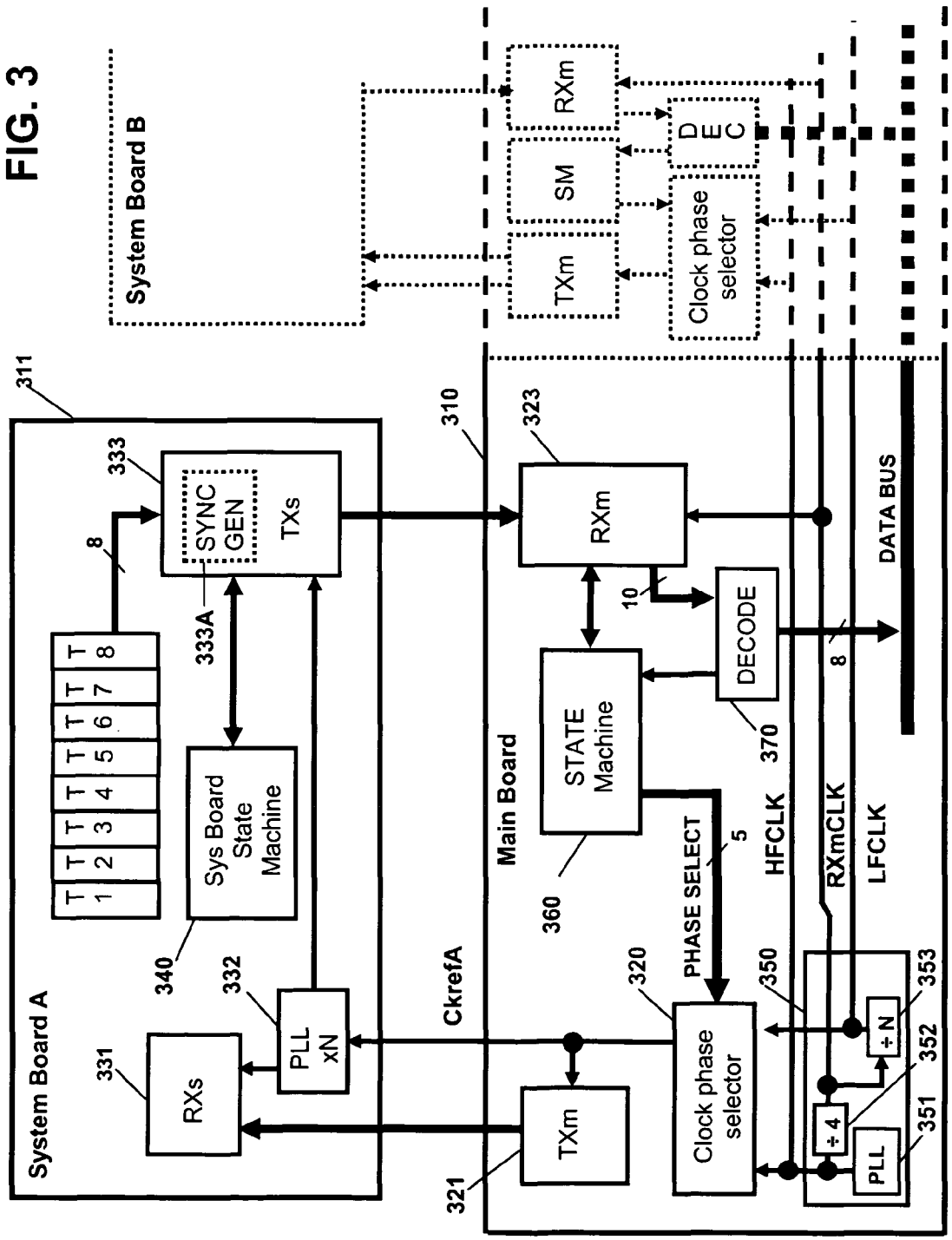
FIG. 3 is a block diagram of an exemplary embodiment of a control loop arrangement in accordance with the present invention.

FIG. 3 shows an inventive control loop arrangement for an individual LVDS interface between a system board 311 and the main board 310. The arrangement uses a clock phase selector 320 on the main board to control the phase of the reference clock (CKrefA) sent from main board transmitter 321 to the system board 311, and more specifically, to PLL 332 associated with system board receiver (RXs) 331 and system board transmitter (TXs) 333. An exemplary implementation of the clock phase selector 320 is described in greater detail below with reference to FIGS. 4A and 4B.

The PLL 332 generates clock signals for the system board receiver (RXs) 331 and transmitter (TXs) 333 that are synchronized with the reference clock (CKrefA) from the main board 310. As such, data is transmitted from the system board transmitter (TXs) 333 to main board receiver (RXm) 323 in synchronism with the reference clock (CKrefA) from the main board 310. The main board receiver (RXm) 323 is clocked by a static-phase reference clock signal (RXmCLK) to sample and process the data signal that it receives from the system board transmitter (TXs) 333.

As discussed above with reference to FIG. 2, the other main board receivers are also clocked by the same clock signal (RXmCLK) thereby allowing the multiple main board receivers to process received data in synchronism with each other, for example, to synchronously provide data to a common bus, even though the data is received over interfaces of varying lengths and delays.

Because the phase of the data signal received by the main board receiver (RXm) 323 is based on the reference clock signal CKrefA from the main board 310, the phase of CKrefA may need to be adjusted by the clock phase selector 320 in order to allow the receiver (RXm) 323, which is clocked by the static-phase reference clock RXmCLK, to lock onto the received data. In the embodiment of FIG. 3, a closed-loop control arrangement achieves such locking by controllably stepping an advancing or retarding phase of the reference clock signal CKrefA until lock is achieved by the main board receiver (RXm) 323. This control arrangement can be considered to anticipate the system delays of the return path from TXs 333 to RXm 323. This control arrangement uses a synchronization circuit to sequentially step the clock phase to a value specific for each serial output supplied to the system board receiver. This arrangement will now be described in greater detail.

A clock generation block 350 on the main board generates a static-phase reference clock signal HFCLK, the static-phase main board receiver reference clock signal RXmCLK and a static-phase lower frequency clock signal LFCLK. In the exemplary embodiment, RXmCLK has a frequency that is one-fourth that of HFLCK and LFLCK has a frequency that is 1/Nth of the frequency of RXmCLK. The frequencies of HFCLK, RXmCLK and LFCLK are selected in accordance with the data rates of the serial interfaces between the main and system boards and the requirements of the main board transmitters and receivers. In an exemplary embodiment, HFLCK has a nominal frequency of 540 MHz, RXmCLK has a nominal frequency of 135 MHz, and LFCLK has a nominal frequency of 27 MHz, with N=5. The frequency of CKrefA corresponds to the frequency of LFCLK. For a standard LVDS interface, the bit rate over the serial data lines is nominally 270 Mbits/sec. The main board receiver (RXm) 323 uses both edges of the 135 MHz RXmCLK signal to clock in the 270 Mbits/sec data signal. The main board transmitter (TXm) 321 will output 10 bits for each cycle of the 27 MHz CKrefA signal. The 10 bits are encoded from 8 bits of data, for a data rate of 216 Mbits/sec. The 54 Mbits/sec of overhead is used to provide synchronization words and command structures as well as to provide a minimized transition code for the 8B/10B encoding.

The clock generation block 350 includes a PLL 351, which generates HFLCK, a divide-by-four block 352 which generates RXmCLK from HFLCK, and a divide-by-N block 353, which generates LFCLK from RXmCLK. Note that while block 352 as shown in FIG. 3 provides frequency division by a factor of four, other values for this factor can be selected depending on the desired resolution of the phase selector 320, as described in greater detail below. For purposes of the present invention, the PLL 351 can be the only PLL on the main board associated with serial loop transmission and reception. For applications in which the system comprising the main board 310 and the system boards 311-314 can operate asynchronously of other entities or systems, the PLL 351 can be eliminated and HFCLK can be generated by a variety of conventional means, for example by a free-running oscillator.

As shown in FIG. 3, HFCLK and LFCLK are provided to the clock phase selector 320, which generates the clock reference signal CKrefA and is provided over a separate conductor to the system board 311. CKrefA is also provided to the main board transmitter (TXm) 321 so that any data sent therefrom over the LVDS interface to the system board receiver (RXs) 331 will be in synchronism with CKrefA. As mentioned above, the frequency of CKrefA corresponds to the frequency of LFCLK.

Under the control of a state machine 360, described below in greater detail, the clock phase selector 320 can adjust the phase of CKrefA until data received by the main board receiver (RXm) 323 is in synchronism with the static-phase reference clock HFCLK and a sync word forming part of the data stream is correctly captured and decoded.

Figure 4A:
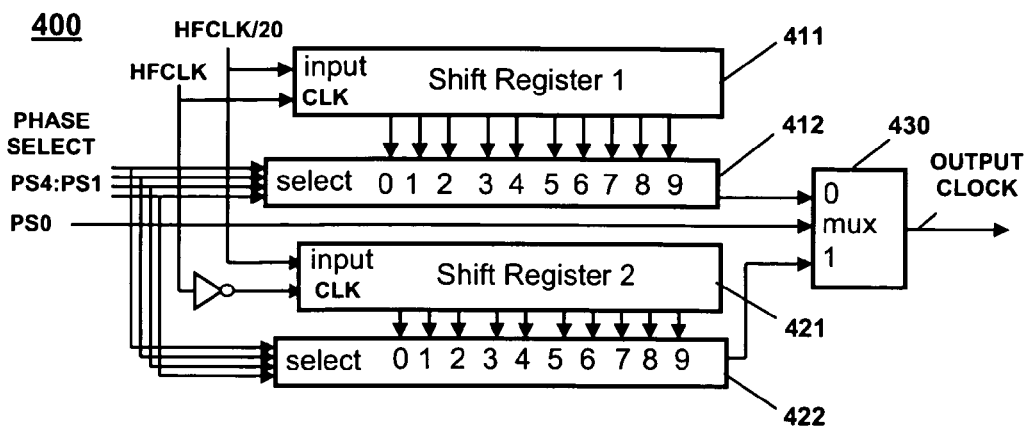
FIGS. 4A is a block diagram of an exemplary embodiment of a clock phase selector in accordance with the present invention.
Figure 4B:
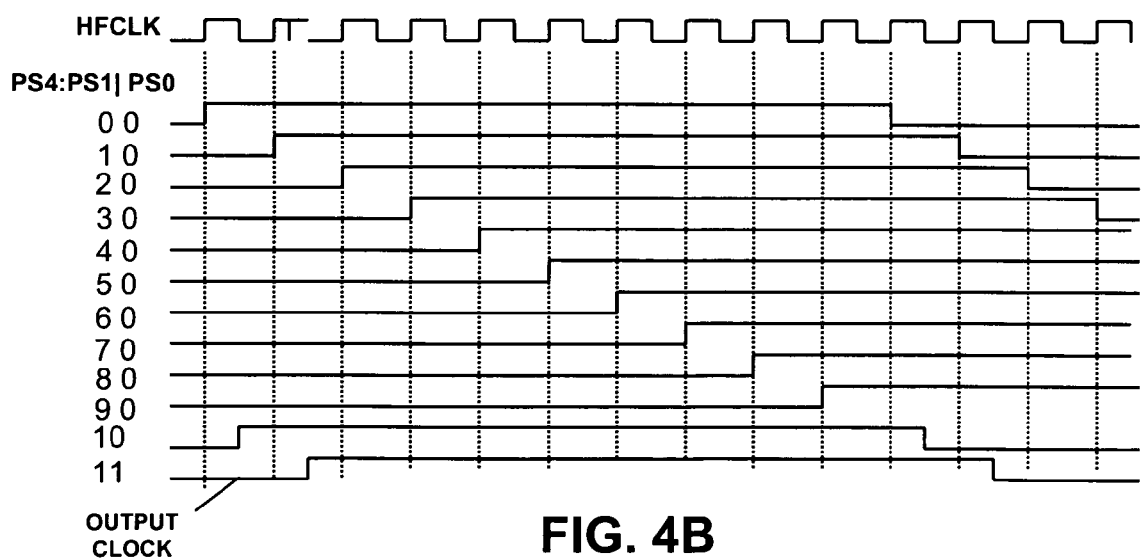
FIG. 4B shows a timing diagram illustrating its operation.

FIG. 4A shows an exemplary embodiment of a clock phase selector 400, such as may be used as clock phase selector 320 in FIG. 3, described above. The inputs to the selector 400 are the high frequency clock signal HFCLK, for example, 540 MHz, the lower frequency clock signal LFCLK, for example, 27 MHz, and a control input PHASE SELECT, which in this embodiment comprises five bits, PS4:PS0. Based on PHASE SELECT, the clock phase selector 400 will output at OUTPUT CLOCK a clock signal corresponding to the lower frequency clock signal LFCLK at one of a plurality of possible phases. FIG. 4B shows 12 of 20 possible phase settings and the corresponding values of PHASE SELECT.

The phase selector 400 comprises two ten-tap shift registers 411 and 421 which are clocked on the rising and falling edges, respectively, of HFCLK to successively shift LFCLK through ten outputs (0-9). The taps of the shift registers 411, 412 provide substantially equal delay increments. The outputs of the shift registers 411 and 421 are coupled to corresponding inputs (0-9) of respective ten-to-one selectors 412 and 422. Each of the selectors 412 and 422 selects one of the ten outputs of its corresponding shift register 411 and 421 for output to a two-to-one multiplexer 430. Based on PS0 of the PHASE SELECT control input, the multiplexer 430 selects the output of either selector 412 or 422 for output as the OUTPUT CLOCK of the clock phase selector 400. In the arrangement of FIG. 3, CKrefA is output at OUTPUT CLOCK.

As such, the clock phase selector 400 employs the high frequency clock signal HFLCK, for example, 540 MHz to provide a defined phase delay through shift registers 411, 421 that are sampling the lower frequency clock signal LFCLK , for example, 27 MHz. Moreover, the use of two shift registers, each clocked on opposite edges of the high frequency clock signal provides double the phase resolution of an implementation with a single shift register. Note, however, that either implementation, among others, is contemplated by the present invention.

Referring again to the arrangement of FIG. 3, the clock phase selector 320, operating as described above, is controlled by the state machine 360 via the PHASE SELECT inputs to adjust the phase of CKrefA until synchronization and sync word detection occurs at the main board receiver (RXm) 323. A decoder 370 coupled to the main board receiver (RXm) 323 provides an indication, for example by a sync word detection flag, to the state machine 360 when synchronized.

In the exemplary embodiment of FIG. 3, source data from exemplary transponder receivers T1-T8 are transmitted from the system board 311 to the main board 310. The source data are presented in byte-synchronized form to the system board transmitter (TXs) 333 where the data undergoes eight to ten bit (8B/10B) encoding which yields one 10-bit word for each 8-bit byte presented. The 10-bit words are then serially transmitted from the system board transmitter (TXs) 333 at a fixed output bit-rate of, for example, 270 Mbit/s. In addition the system board transmitter (TXs) 333 generates and encodes, as depicted by dotted box 333A, a synchronization word which has a unique 10-bit pattern which is one of a group of control functions that cannot be generated by the source data bytes. The sync word may be formed using hard wired logic, a lookup table or the like. The generation, insertion and transmission of synchronization words from the system board 311 is controlled by a system board state machine 340. For example state machine 340 causes the formation or generation and insertion of a synchronization word between source transport packets. In addition, if transmitter (TXs) 333 requests a new input word but data from sources T1-T8 is not available, one or more synchronization words are generated until source data is available and these sync words form the serial stream transmitted to the main board 310. The format and content of synchronization words and the operation of the system board state machine 340 may be in accordance with well-known techniques and standards, such as described, for example, in European Standard EN 50083-9 for Cabled Distribution Systems, Part 9.

At the main board, the receiver (RXm) 323 recovers the 10-bit words received in the serial stream from the system board 311. The recovered serial data bits are passed to the decoder 370 which converts the 10-bit transmission words back into 8-bit bytes originally provided by data sources T1-T8. In order to recover byte alignment, the decoder 370 initially searches for synchronization words. Once found, the start of the synchronization word marks the boundary of subsequent received data words and establishes proper byte-alignment of the 8-bit data bytes output by the decoder 370. The data bytes output by the decoder 370 may be output to a common data bus on the main board 310.

Figure 5:
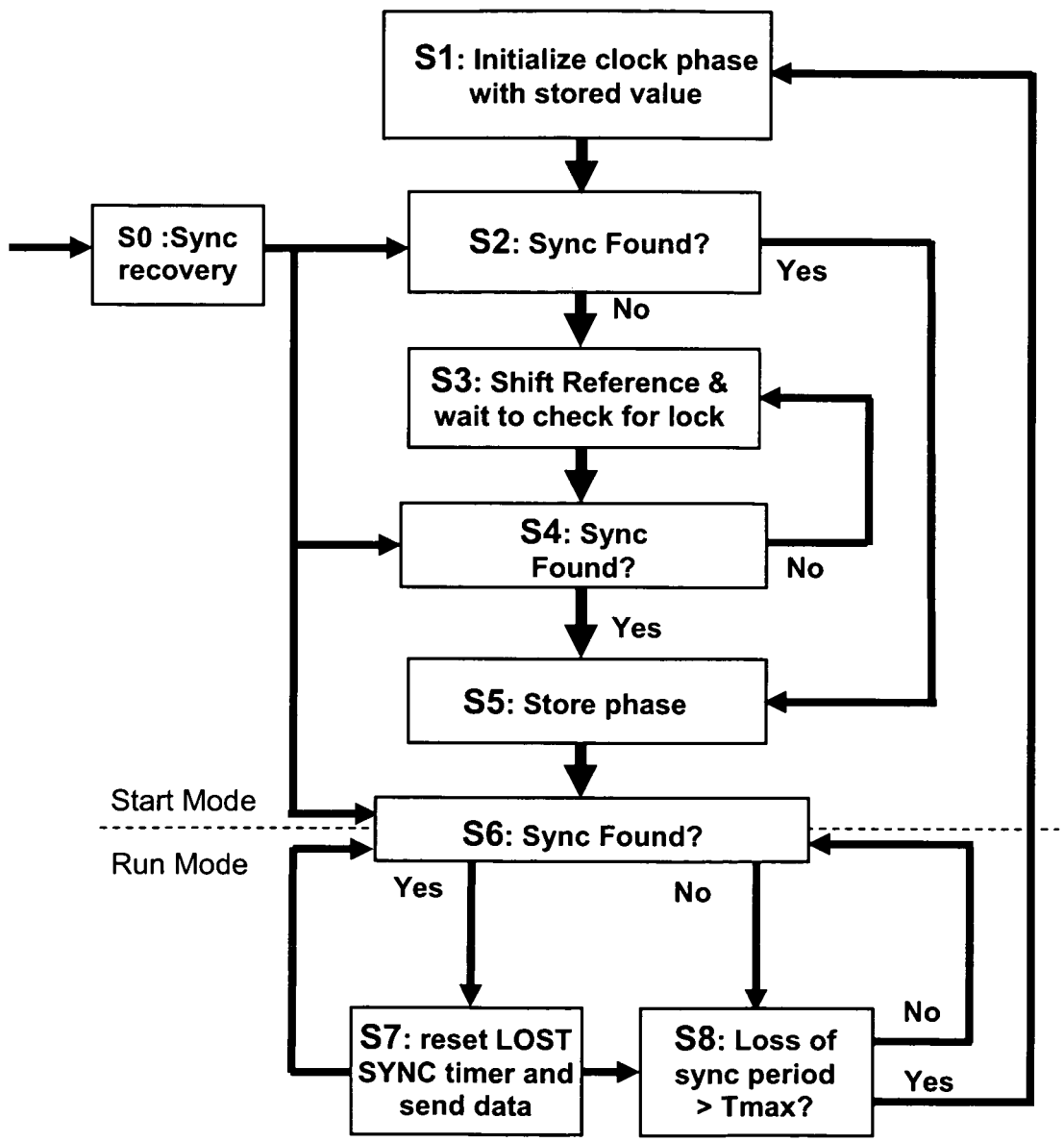
FIG. 5 is a state diagram illustrating the operation of a state machine in the control loop arrangement of FIG. 3.

FIG. 5 illustrates the operation of the state machine 360 for controlling the phase adjustment control loop arrangement of FIG. 3. At an initial state SI, such as at power-up, an initial value for the PHASE SELECT control is provided to the clock phase selector 320. This value can be obtained, for example, from a storage device or other suitable means. The storage device may contain a default value or a value determined in a previous synchronization procedure, as described below.

Operation proceeds to state S2, at which point the state machine 360 checks the decoder 370 to determine whether or not a synchronization word has been received by the main board receiver (RXm) 323. If it is determined at state S2 that a synchronization word has been received, it is deemed that synchronism has been achieved with the start of the synchronization word marking the boundary of subsequent received data words. With synchronization achieved (YES) operation proceeds to state S5, in which the current PHASE SELECT value is stored. However, if synchronism has not been achieved at state S2, the operation proceeds to state S3.

At state S3 the PHASE SELECT value provided to the clock phase selector 320 is changed, preferably by a small amount, for example one step in the exemplary shift register arrangement of FIG. 4A. Checking for synchronism with the new clock phase setting is performed at state S4 following a predetermined pause of, for example one half second, to ensure loop stabilization. If the synchronism is not found, operation reverts to state S3 which causes the clock phase selector 320 to change the phase of the reference clock (CKrefA) once more. Following the predetermined pause the received data is re-checked at state S4 for synchronism by the presence or absence of the synchronization word at the decoder 370. This looping procedure between states S3 and S4 is repeated until synchronism is established.

Once it is determined at state S4 that synchronism has been established, operation proceeds to state S5 in which the current PHASE SELECT value is stored and used by the clock phase selector 320 for as long as it is determined in state S6 that there is synchronism. The PHASE SELECT value at which lock occurs can also be stored for future use, as mentioned above.

While there is synchronism as indicated by a detected sync word flag, operation loops between states S6 and S7. State S7 thus forms a sync check loop with state S6. In addition every detected sync word flag at state S7 resets a LOST SYNC timer which is checked later in state S8. In an exemplary embodiment, the LOST SYNC timer has a maximum count Tmax of, for example, approximately 1,000 bytes or approximately five MPEG transport packets. During normal operation, the state machine loops between states S6 and S7 and data and SYNC bits continue to flow across the LVDS serial lines. The system board state machine 340 causes the system board transmitter TXs 333 to insert and send sync signals or words between source data packets and continuously when data is not available from sources T1-T8. If it is determined at state S6 that a synchronization word is lost, missing or, for example, not received when expected based on source packet duration, state S8 is entered and the LOST SYNC timer is checked to see if the maximum count value Tmax has been exceeded. If Tmax has not been exceeded, it is likely that long strings of data may have been sent and operation goes back to state S6 to check for the reception of a synchronization word flag. If synchronism is still lacking, operation goes back to state S8 and the timer is checked again to determine if the maximum count has been exceeded. If so, this is indicative of a synchronization problem, and the synchronization process is restarted at state S1 in an attempt to re-acquire synchronism as described above.

It should be noted that the sync recovery process of FIG. 5 can be invoked under various conditions. As represented by state S0, the state machine 360 is aware of incoming synchronization words and closely monitors the incoming data when trying to determine the proper clock phase. When it is determined that synchronization is to be recovered, the operation of the state machine can transition to states S2, S4 or S6, depending on the reason for the synchronization recovery.

In a further inventive arrangement a robust arrangement for centering the synchronization can be provided using a table of averaged possible delays with a center value taken to provide the best reference phase for each clock. By preferably using a high frequency clock (HFCLK) for the clock phase selector 320 whose resolution is greater than required for example, a multiple of RXmCLK, such as 540 MHz vs. 135 MHz, as set by the divider 352, it is possible that multiple, for example, four clock phases of the 20 possible clock phases will allow the main board receiver (RXm) to lock onto the received data signal. These multiple phases will likely be contiguous, thereby corresponding to a contiguous range of PHASE SELECT values facilitate locked synchronism. Instead of stopping the detection process with the first phase setting that achieves lock, the detection process is repeated to find all of the PHASE SELECT values that achieve lock. Once detected, a phase setting at the center of the range is preferably selected to center the clock phase on the successful locks. Thus, for example, in the case of a cluster of four PHASE SELECT values, for example 1 to 4, it is preferable to use values 2 or 3 rather than 1 or 4 since they would provide a greater margin against phase variations that may be caused, for example, by temperature changes or noise.

The state machine 360 can be implemented in any of a variety of suitable arrangements, including, for example, a microprocessor, microcontroller, dedicated logic, FPGA, or software amongst other suitable arrangements.

In the inventive arrangement described above, the serial communication interface is designed to start up and look for synchronization at the receivers. Once synchronization is found, the serial lines are allowed to send source data packets. Synchronization words continue to be inserted between source packets to provide communication and constant checking to ensure that the receivers receive correct data. In this way a simple, robust and expandable system is achieved.

In the above-described embodiments, the main board receivers (RXm) are clocked with a common, static-phase clock signal (RXmCLK) while the main board transmitters (TXm) are each clocked by an individually phase-adjusted clock signal generated as described above to achieve synchronism at each of the main board receivers (RXm). In a further exemplary embodiment, each transmitter on the main board is driven by a common, static-phase, master reference clock, while each receiver on the main board is driven by a clock whose phase is controlled so as to achieve synchronism with the data signal received by that receiver. In such an embodiment, however, while the main board transmitters (TXm) will transmit data in synchronism with each other, the main board receivers (RXm) will receive data which typically will not be in synchronism with each other due to the different interface lengths (LA-LD).

The present invention can be applied to a variety of serial data interfaces, including, for example, low-voltage differential signaling (LVDS) interfaces among others.

It is understood that the above-described embodiments are illustrative of only a few of the possible specific embodiments which can represent applications of the invention. Numerous and varied other arrangements can be made by those skilled in the art without departing from the spirit and scope of the invention.

The invention claimed is:

1. An apparatus comprising:
 a bidirectional low-voltage differential signaling (LVDS) interface coupled between first and second terminals each having a receiver and a transmitter for data communication;
 a phase locked loop coupled to said second receiver and to said second transmitter at said second terminal;
 a sync word generator forming a sync word for transmission by said second transmitter;
 a reference clock coupled to said first receiver at said first terminal; and
 a phase selector for selecting a phase of a signal derived from said reference clock, said selected phase signal being coupled to said first transmitter and communicated to said phase locked loop for synchronizing said second receiver and said second transmitter, said phase selector being controlled responsive to said sync word received by said first receiver from said second transmitter.

2. The apparatus of claim 1, comprising a first state machine coupled to said sync word generator and controlling said sync word generation.

3. The apparatus of claim 2, wherein generation of said sync word occurs during source data absence.

4. The apparatus of claim 2, wherein generation of said sync word occurs at each transport packet.

5. The apparatus of claim 1, comprising a second state machine coupled to said first receiver for monitoring said sync word received by said first receiver, wherein said second state machine controls said phase selector to change said signal phase so as to receive said sync word without error.

6. The apparatus of claim 5, wherein said first receiver is supplied with a constant phase reference signal.

7. The apparatus of claim 1, comprising:
 a further bidirectional LVDS interface coupled between third and fourth terminals each having a receiver and a transmitter for data communication;
 a further PLL coupled to said fourth receiver and to said fourth transmitter at said fourth terminal;
 a further sync word generator coupled to add a sync word to data for transmission by said fourth transmitter; and
 a further phase selector for selecting a phase of a further signal derived from said reference clock, said further selected phase signal being coupled to said third transmitter and communicated to said further PLL for synchronizing said fourth receiver and said fourth transmitter, said further phase selector being controlled responsive to said further sync word received by said third receiver from said fourth transmitter, wherein the reference clock is coupled to said third receiver for decoding said sync word.

8. The apparatus of claim 7, wherein said first and third terminals are on the same board.

9. The apparatus of claim 7, wherein said second and fourth terminals are on different boards.

10. The apparatus of claim 7, wherein a length of the LVDS interface and a length of the further LVDS interface are different.

11. The apparatus of claim 7, wherein said phase of the selected phase signal and said phase of the further selected phase signal are different.

12. The apparatus of claim 1, wherein said sync word comprises a predefined sequence of bits.

13. A method comprising:
transmitting a first clock signal from a first terminal to a second terminal;
adding a sync signal to data for transmission;
transmitting the data and the sync signal from the second terminal to the first terminal in accordance with the first clock signal;
receiving the data and the sync signal at the first terminal in accordance with a second clock signal, said first clock signal having a different phase than said second clock signal; and
controlling a phase of the first clock signal to synchronize data received at the first terminal with the second clock signal, the phase of the first clock signal being controlled responsive to the sync signal received by said first terminal.

14. The method of claim 13, comprising;
controlling the phase of the first clock signal to receive the sync signal without error.

15. The method of claim 13, comprising:
transmitting a third clock signal from a third terminal to a fourth terminal;
adding a sync signal to data for transmission by said fourth terminal;
transmitting the data from the fourth terminal to the third terminal in accordance with the third clock signal;
receiving the data at the third terminal in accordance with the second clock signal; and
controlling a phase of the third clock signal so that the data received at the third terminal is in synchronization with the second clock signal, said phase of the third clock signal being controlled responsive to said sync signal received by said third terminal.

16. The method of claim 15, wherein the first and third terminals are on the same board and the second and fourth terminals are on different boards.

17. The method of claim 15, wherein the phase of the first clock signal and the phase of the third clock signal are different.

18. The method of claim 15, wherein the sync signal comprises a predefined sequence of bits.

19. The method of claim 13, wherein the sync signal is controlled by a first state machine.

20. The method of claim 19, wherein said sync signal is added during source data absence.

21. The method of claim 19, wherein said sync signal is added to each transport packet.

22. The method of claim 13, wherein the controlling a phase of the first clock signal is performed by a second state machine.

23. The method of claim 22, wherein said first receiver is supplied with a constant phase reference signal.

* * * * *